United States Patent
Schneider

(10) Patent No.: US 8,393,046 B2
(45) Date of Patent: Mar. 12, 2013

(54) PROTECTIVE SLEEVE FOR REAR WINDOW WIPER

(76) Inventor: John F. Schneider, Sacramento, CA (US)

( * ) Notice: Subject to any disclaimer, the term of this patent is extended or adjusted under 35 U.S.C. 154(b) by 462 days.

(21) Appl. No.: 12/725,978

(22) Filed: Mar. 17, 2010

(65) Prior Publication Data

US 2010/0236675 A1    Sep. 23, 2010

Related U.S. Application Data

(60) Provisional application No. 61/161,512, filed on Mar. 19, 2009.

(51) Int. Cl.
*B60S 1/04* (2006.01)
(52) U.S. Cl. .................. 15/250.001; 15/257.01; 150/154
(58) Field of Classification Search .............. 15/257.01, 15/250.001, 250.16, 250.19, 247; 383/72, 383/74, 75, 76, 119; D12/220; 24/30.5 R, 24/115 G; 150/154, 156, 160–163
See application file for complete search history.

(56) References Cited

U.S. PATENT DOCUMENTS

| | | | | |
|---|---|---|---|---|
| 2,288,592 A * | 7/1942 | Mirhige | ........................... | 15/247 |
| 2,417,336 A * | 3/1947 | Whitehead | .................... | 150/160 |
| 2,678,672 A * | 5/1954 | Spilman | ........................... | 383/73 |
| 2,818,900 A * | 1/1958 | Forman | ........................... | 383/71 |
| 4,002,821 A * | 1/1977 | Satoh et al. | ................ | 174/153 G |
| 4,974,709 A * | 12/1990 | Furlow et al. | .................. | 190/102 |
| 5,403,009 A * | 4/1995 | Gleason, Jr. | ................... | 473/256 |
| 5,412,177 A | 5/1995 | Clark | | |
| 6,070,287 A | 6/2000 | Kornegay | | |
| 6,247,201 B1 | 6/2001 | McCray | | |
| 6,327,738 B1 | 12/2001 | Lewis | | |
| D586,716 S | 2/2009 | Radfar | | |
| 2005/0235448 A1* | 10/2005 | Richard | ...................... | 15/257.01 |
| 2006/0266453 A1* | 11/2006 | Cirone | .......................... | 150/154 |

FOREIGN PATENT DOCUMENTS

EP    577093 A1 *    1/1994

OTHER PUBLICATIONS

Tyvek definition, http://formaxprinting.com/blog/tag/tyvek-definition/, Jun. 3, 2011.*
Types of Grommets, ehow.com, Aug. 2, 2012.*

* cited by examiner

*Primary Examiner* — Mark Spisich
*Assistant Examiner* — Andrew A Horton
(74) *Attorney, Agent, or Firm* — Kenneth L. Green

(57) ABSTRACT

A wiper protector fits over a rear window wiper to prevent damage to the wiper from a mechanized or automated car wash. The wiper protector is open on one end for slipping over the wiper blade, arm and wiper motor components if exposed. The sleeve includes a cutout at the open end to fit over the wiper motor components. A drawstring near the open end passes through the sleeve guided by non-marring grommets near the sleeve open end. A drawstring lock maintains tension on the drawstring during use.

2 Claims, 4 Drawing Sheets

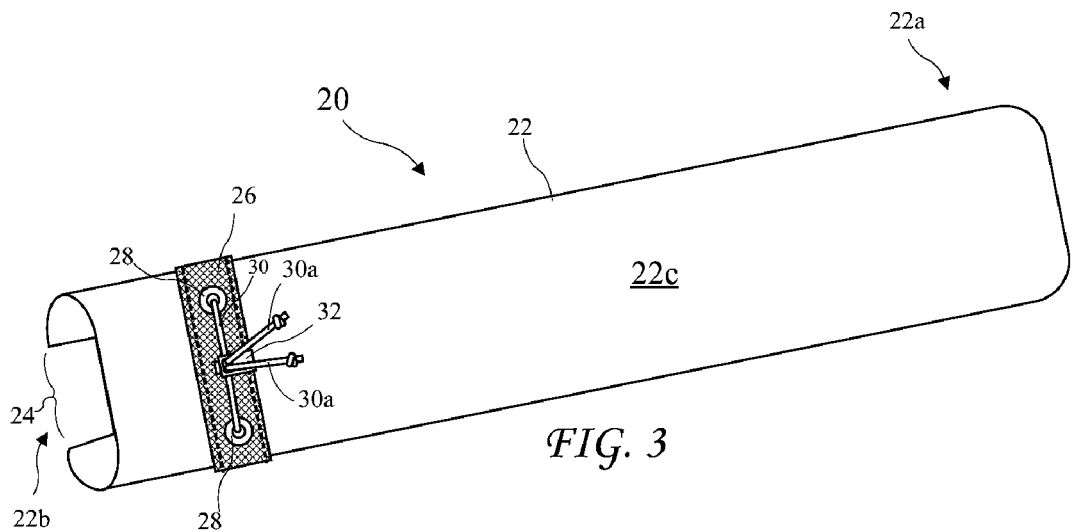
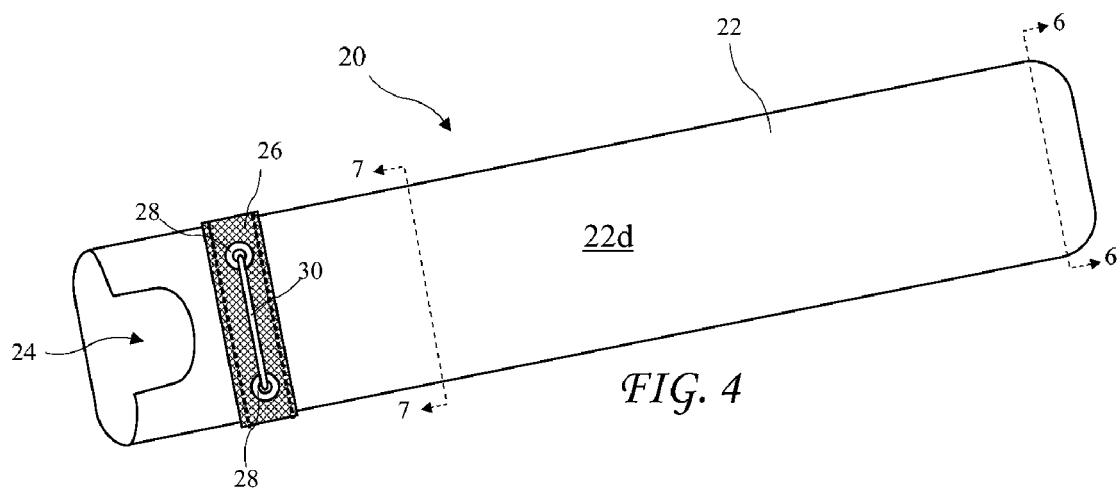
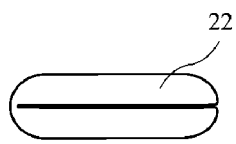
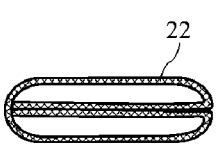
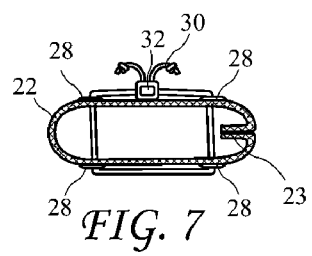

PROTECTIVE SLEEVE FOR REAR WINDOW WIPER

The present application claims the priority of U.S. Provisional Patent Application Ser. No. 61/161,512 filed Mar. 19, 2009, which application is incorporated in its entirety herein by reference.

BACKGROUND OF THE INVENTION

The present invention relates to sleeves for protecting exposed members of vehicles running through mechanized or automated car washes and in particular to a sleeve for protecting a rear window wiper of vehicles being washed by the car washes.

In our hurried society many vehicle drivers utilize mechanized or automated car washes to maintain clean vehicles. The International Carwash Association estimates the professional car wash industry is a $23 billion annual industry. Unfortunately, a large number of rear window wipers on vehicles are being damaged during washing by these car wash mechanisms. Bosch, a European automotive and industrial technology company with €45.4 Billion in sales, estimates over 30% of autos on the road today have a rear window wiper blade. The mechanized or automated car washes are comprised of mechanisms including spinning or moving brushes and chamois that contact the vehicle, the components of which often become entangled in the wiper blade, wiper arm, and/or its components. When an entanglement occurs, the wiper blade, wiper arm, associated components; the vehicle; and/or the car wash mechanisms are damaged. For example, mechanized or automated car wash brushes may grab the wiper arm and rip the arm away from the window, or the brushes may be caught between motor housings of the wipers and rip the wiper blades away from the housings. In either case, the wipers and/or wiper mechanisms are often damaged.

Data from the International Carwash Association (ICA) indicates that approximately 40 percent of vehicle damage from mechanized and automated car washes is wiper damage. Some carwash operators have reported that wiper damage is their number one problem. Some carwash operators tape wipers down before the vehicle is run through the car wash, and some carwash operators report spending $200 per month on tape for this purpose. Other carwash operators use plastic bags to cover the wipers and some car wash operators use both the tape and plastic bags. Unfortunately, neither the tape, plastic bags, nor both work in all cases. For example, the tape may not hold because of too much power from the car wash mechanisms and failure of the tape to adhere to the vehicle. As a result, damage often occurs even when the wiper was taped and covered with a plastic bag.

U.S. Pat. No. 6,247,201 for "Rear Wiper Blade Protective Device" discloses a hard cylindrical tube with suction cups for attachment. The user slides the tube over the windshield wiper blade and presses the suction cups against the window glass to retain the tube on the wiper blade. While the device of the '201 patent provides some protection, it fails to provide an adequate solution. For example, known rear window wipers come to rest on a blade support which holds the blade away from the window glass. The blade support interferes with the ability of the device of the '201 patent to cover the wiper and prevents the attachment of the suction cups. Additionally, a gap exposes a portion of the wiper blade and/or wiper arm, and elements of the automatic car wash can catch on the exposed elements and rip the wiper away from the vehicle. The hard plastic components of the device of the '201 patent themselves can cause entanglement with the car wash mechanisms. When this device of the '201 patent becomes dislodged during the wash process, its hard components may further damage the vehicle. The '201 patent is herein incorporated by reference.

Therefore, a need remains for successfully protecting rear window wipers in mechanized or automated carwashes.

BRIEF SUMMARY OF THE INVENTION

The present invention addresses the above and other needs by providing a wiper protector which fits over a rear window wiper to prevent damage to the wiper from a mechanized or automated car wash. The wiper protector is open on one end for slipping over the wiper blade, arm and wiper motor components if exposed. The sleeve includes a cutout at the open end to fit over the wiper motor components. A drawstring near the open end passes through the sleeve guided by non-marring grommets near the sleeve open end. A plastic drawstring lock maintains tension on the drawstring during use.

In accordance with another aspect of the invention, there are provided an apparatus and securement components which are constructed completely of material that will not harm the vehicle or mar the vehicle's finish during installation and removal, while installed, and during the car wash process.

In accordance with another aspect of the invention, the wiper protector is secured to the vehicle using either a drawstring, passed through non-marring grommets or a sewn drawstring pocket, with a tightening device; a hook and loop strap attached to the sleeve; a webbing strap and quick release buckle; or similar components which cinch the sleeve around the wiper arm and can also be placed around the wiper motor shaft, wiper motor, or the glass or door handle and be secured thereto by tightening, buckling, clipping, or similar fastening methods.

In accordance with yet another aspect of the invention, the wiper protector covers and protects the wiper drive shaft, motor components, cover, and glass/door handle. The wiper protector is constructed of materials which will not harm or mar the vehicle or its finish. The wiper protector is shaped and constructed to prevent entanglement of car wash mechanisms. The sleeve design incorporates a stiffening spine to ease installation and removal. The wiper protector may be constructed and shaped to fit all types of wiper designs and vehicles and has multiple methods for securing it to the wiper and vehicle. The wiper protector may include a handle to ease its installation and removal. The wiper protector may be used on any wiper attached to a vehicle including rear glass, front glass, and headlamps.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 3 is a front view of a wiper protector according to the present invention.

FIG. 4 is a rear view of the wiper protector according to the present invention.

FIG. 5 is a view of a closed end of the wiper protector according to the present invention.

FIG. 6 is a cross-sectional view of the wiper protector according to the present invention taken along line 6-6 of FIG. 4.

FIG. 7 is a second cross-sectional view of the wiper protector according to the present invention taken along line 7-7 of FIG. 4.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
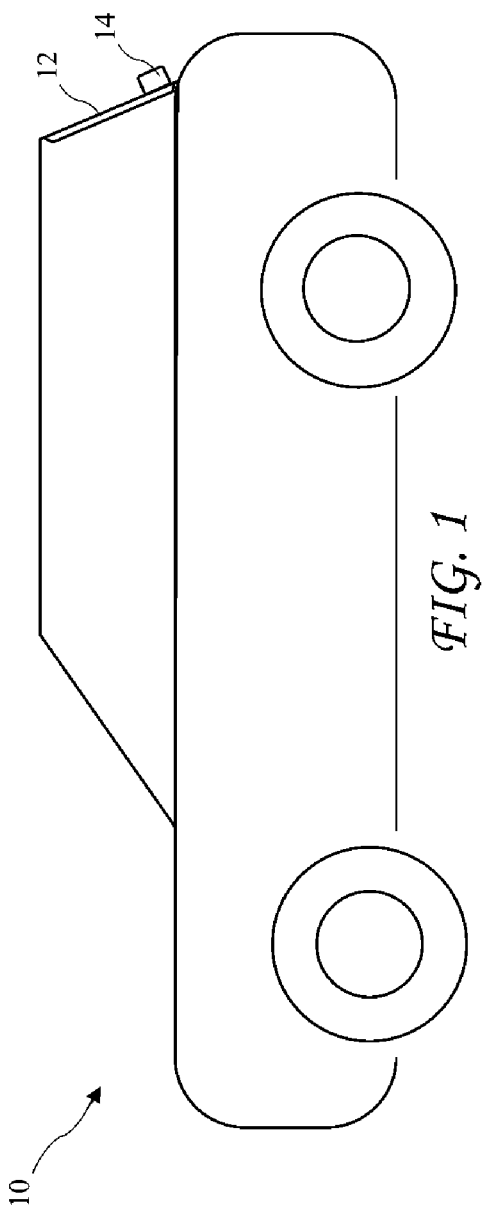
FIG. 1 is a side view of a vehicle with a rear window wiper.
Figure 2:
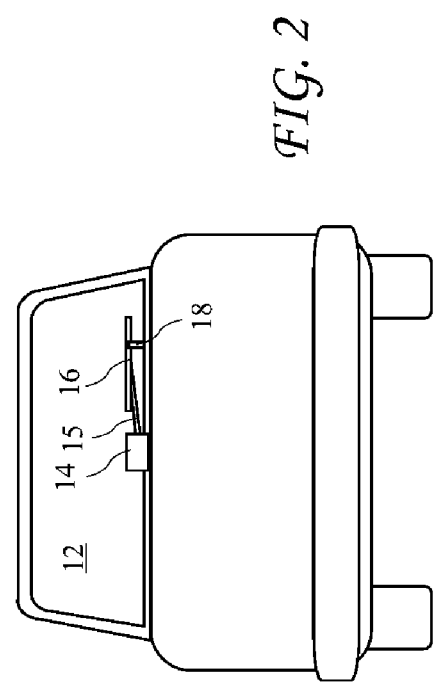
FIG. 2 is a rear view of the vehicle with the rear window wiper.

A side view of a vehicle 10 with a rear window wiper 16 on a rear window 12 of the vehicle 10 is shown in FIG. 1 and a rear view of the vehicle 10 with the rear window wiper 16 is shown in FIG. 2. The wiper 16 is connected to an exposed wiper motor 14 by a wiper arm 15, but may be connected to a shaft connected to a wiper motor inside the vehicle body. The wiper 16 is held away from the window 12 by a blade support 18 when not in operation.

A front view of a wiper protector 20 according to the present invention is shown in FIG. 3, a rear view of the wiper protector 20 is shown in FIG. 4, and a view of a closed end 22a of the wiper protector 20 is shown in FIG. 5. The wiper protector 20 includes a sleeve 22 with special features for the intended use. The sleeve 22 includes a cutout 24 provided on the rear surface 22d of the sleeve 22 at an open end 22b opposite the closed end 22a. A belt 26 is sewn around the sleeve 22 near the open end 22b, but not overlapping the cut out 24. Two grommets 28 reside on both the front and rear surfaces 22c and 22d of the sleeve 22 (a total of four grommets) and are preferably attached to the sleeve 22 through the belt 26. The grommets are made of a specialized material which, upon contact with the auto, will not damage the auto or its finish, and the grommets are preferably made from thermoplastic polymer to avoid damaging vehicle paint and available from Plastgrommet in Spain and are pressed (or crimped) together two piece grommets. The belt 26 is preferably made from woven nylon material. The loose ends 30a of the drawstring 30 pass through a drawstring lock 32 for holding the drawstring 30 in a cinched condition.

A cross-sectional view of the sleeve 22 taken along line 6-6 of FIG. 4 showing the closed end 22a is shown in FIG. 6 and a second cross-sectional view of the sleeve 22 taken along line 7-7 of FIG. 4 showing the drawstring 30 is shown in FIG. 7. The drawstring 30 extends through the sleeve 22 between the grommets 28 and is preferably exposed outside the rear side of the sleeve 22 to encircle and engage the wiper motor components 14 (see FIG. 2) and when cinched, preferably secures the wiper protector 20 on the wiper arm.

A stiffening spine 23 is formed along one edge of the sleeve 22. The stiffening spine 23 is formed by a sewn seam along an edge of a folded sheet of flat material forming the sleeve 22, where about one half of an inch of the flat material extends past the seam to create the stiffening spine 23 inside the sleeve 22. The stiffening spine 23 helps the sleeve 22 maintain shape and simplifies sliding the sleeve 22 over the wiper 16.

Figure 8:
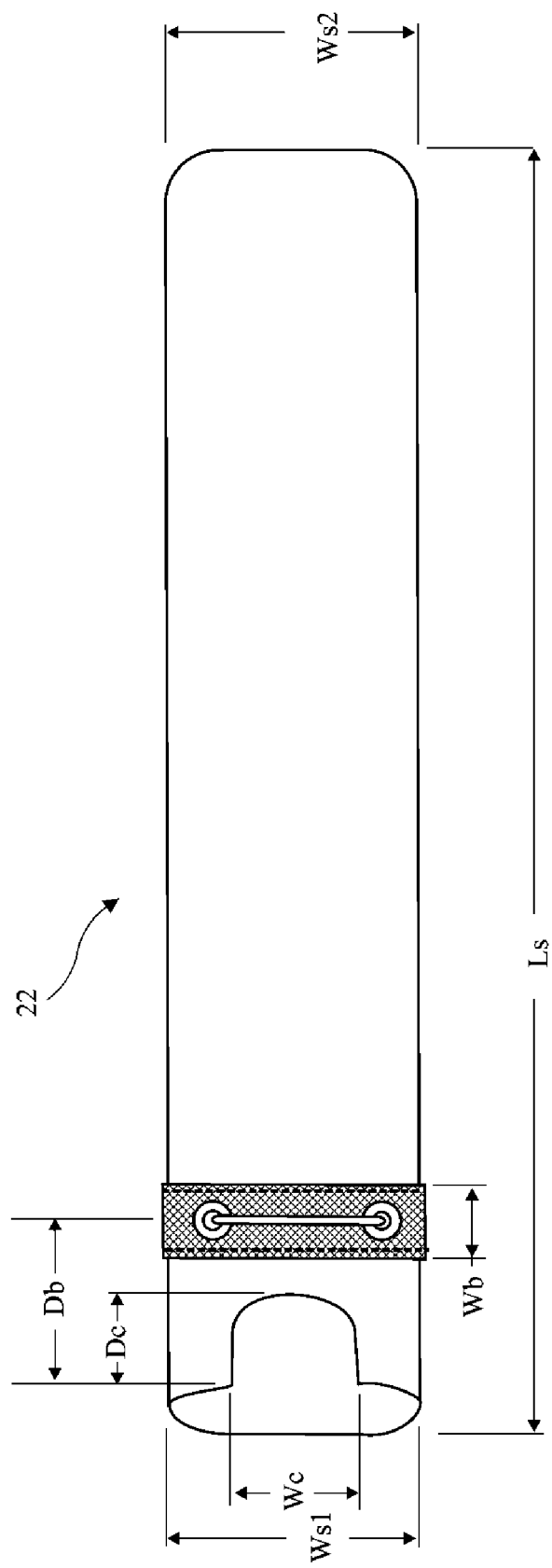
FIG. 8 is a front view of the wiper protector.

A front view of the wiper protector 20 showing dimensions is shown in FIG. 8. The wiper protector 20 has an overall length Ls, a first width Ws1 at the open end, and a second width Ws2 at the closed end. The length Ls is preferably between 23 and 25 inches to fit a typical rear window wiper, but may be much shorter for a headlight wiper. The width Ws1 is preferably approximately one inch greater than the width Ws2 to allow the wiper protector 20 to slide completely over the wiper motor 14 and provide a good fit to the smaller wiper blade 16, and described absolute terms, the width Ws1 is preferably approximately 7.5 inches and the width Ws2 is preferably approximately 6.5 inches with the sleeve laying flat. The cutout 24 has a width Wc and a depth Dc. The width Wc is preferably approximately 4.5 inches and the depth Dc is preferably approximately 2.5 inches. The belt 26 has a width Wb and resides centered a depth Db from the open end 22b. The width Wb is preferably approximately two inches and the depth Db is preferably approximately four inches.

The dimensions described above are for a wiper protector for use with a typical rear window wiper, and a wiper protector having the features of the wiper protector herein described but having different dimensions for a different size rear window wiper, or a headlight wiper, is intended to come within the scope of the present invention.

Figure 9:
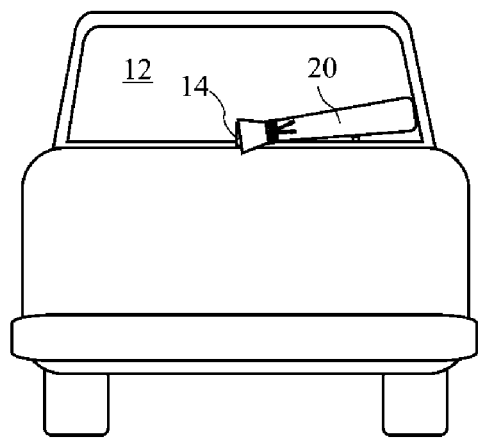
FIG. 9 is a rear view of the vehicle with the wiper protector according to the present invention residing over the wiper.
Figure 11:
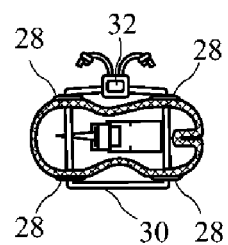
FIG. 11 is a cross-sectional view of the wiper protector according to the present invention residing over the wiper taken along line 11-11 of FIG. 10.
Figure 10:
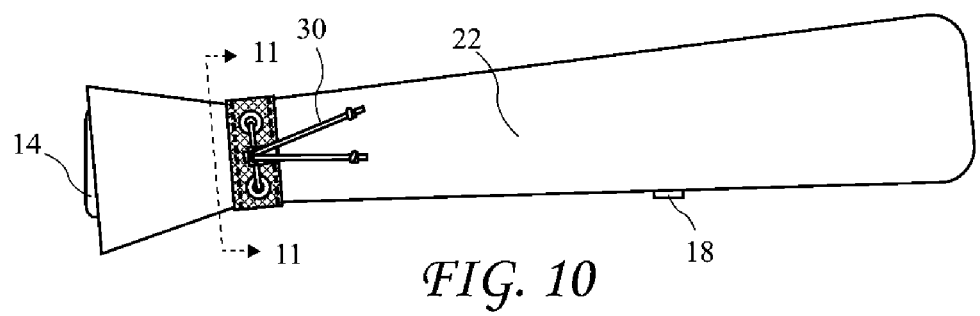
FIG. 10 is a detailed view of the wiper protector according to the present invention residing over the wiper.

A rear view of the vehicle 10 with the wiper protector 20 according to the present invention residing over the wiper 16, and associated components wiper motor 14 and wiper arm 15, is shown in FIG. 9, a detailed view of the wiper protector 20 residing over the wiper 16 is shown in FIG. 10, and a cross-sectional view of the wiper protector 20 residing over the wiper 16, and associated components wiper motor 14 and wiper arm 15, taken along line 11-11 of FIG. 10 is shown in FIG. 11. The wiper protector 20 is shown with the drawstring 30 cinched and held by the lock 32 to engage the wiper arm 15 (see FIG. 2) to secure the wiper protector 20 on the wiper.

While the invention herein disclosed has been described by means of specific embodiments and applications thereof, numerous modifications and variations could be made thereto by those skilled in the art without departing from the scope of the invention set forth in the claims.

I claim:

1. A rear wiper protector comprising:
   a sleeve made from a folded sheet of material and having a sleeve interior for enclosing a wiper blade, a wiper arm and wiper motor components;
   a sleeve length of the sleeve of between 23 and 25 inches;
   a sleeve width of the sleeve of about 7.5 inches;
   an open end of the sleeve allowing sliding the sleeve over a rear window wiper and a closed end opposite the open end;
   a stiffening spine comprising a sewn seam along an inside edge of the sleeve;
   a cutout on a rear surface of the sleeve at the open end of the sleeve to allow a portion of a front surface of the sleeve opposite the cutout to cover the wiper motor component, the cutout having a width of about 4.5 inches and a depth of about 2.5 inches;
   a belt sewn to the exterior of the sleeve about 4 inches from the open end and past the cutout and positioned on the sleeve to reside between the wiper blade and the wiper motor components;
   two front grommets residing through the belt and spaced apart on the front surface of the belt and two rear grommets residing through the belt and spaced apart on the rear surface of the belt, the grommets comprising pressed together two piece plastic grommets; and a drawstring crossing the rear face of the belt between the rear grommets, passing through the rear grommets into the interior of the sleeve, passing through the interior of the sleeve and out of the interior of the sleeve through the front grommets and through a drawstring lock.

2. A vehicle and a rear wiper protector comprising:

a vehicle having a rear window;

a rear wiper mechanism attached to the vehicle for wiping water from the rear window, the wiper mechanism comprising a rear wiper blade, a rear wiper arm and rear wiper motor components;

a sleeve made from a folded sheet of material and having a sleeve interior for enclosing the rear wiper blade, the rear wiper arm and the rear wiper motor components;

an open end of the sleeve allowing sliding the sleeve over the rear window wiper and a closed end opposite the open end;

a stiffening spine comprising a sewn seam along an inside edge of the sleeve;

a cutout on a rear surface of the sleeve at the open end of the sleeve to allow a portion of a front surface of the sleeve opposite the cutout to cover the rear wiper motor components;

a belt sewn to the exterior of the sleeve proximal to the open end and past the cutout and positioned on the sleeve between the rear wiper blade and the rear wiper motor components;

two front grommets spaced apart on the front surface of the sleeve and two rear grommets spaced apart on the rear surface of the sleeve, the grommets comprising crimped together two piece plastic grommets; and a drawstring crossing the rear face of the sleeve between the rear grommets, passing through the rear grommets into the interior of the sleeve, passing through the interior of the sleeve and out of the interior of the sleeve through the front grommets and through a drawstring lock, the drawstring cinching the sleeve between the rear wiper blade and the rear wiper motor components to hold the rear wiper protector in place on the rear wiper mechanism when the vehicle is in a car wash to protect the wiper mechanism from damage by the car wash.

* * * * *